(12) United States Patent
Altshuler et al.

(10) Patent No.: US 10,872,166 B2
(45) Date of Patent: Dec. 22, 2020

(54) SYSTEMS AND METHODS FOR SECURE PREDICTION USING AN ENCRYPTED QUERY EXECUTED BASED ON ENCRYPTED DATA

(71) Applicant: Netz Forecasts Ltd., Tel-Aviv (IL)

(72) Inventors: Yaniv Altshuler, Ramat Yishay (IL); Goren Gordon, Rishon LeZion (IL)

(73) Assignee: Netz Forecasts Ltd., Tel-Aviv (IL)

( * ) Notice: Subject to any disclaimer, the term of this patent is extended or adjusted under 35 U.S.C. 154(b) by 246 days.

(21) Appl. No.: 16/128,599

(22) Filed: Sep. 12, 2018

(65) Prior Publication Data

US 2020/0082112 A1 Mar. 12, 2020

(51) Int. Cl.
*H04L 29/06* (2006.01)
*G06F 21/62* (2013.01)

(52) U.S. Cl.
CPC .................. *G06F 21/6227* (2013.01)

(58) Field of Classification Search
None
See application file for complete search history.

(56) References Cited

U.S. PATENT DOCUMENTS

| | | | | |
|---|---|---|---|---|
| 6,970,849 B1 * | 11/2005 | DeMello | ................. | G06F 21/10 705/52 |
| 9,930,020 B2 * | 3/2018 | Yeap | ...................... | G06Q 20/02 |
| 2009/0119518 A1 * | 5/2009 | Staddon | ............... | G06F 21/6227 713/193 |
| 2013/0246813 A1 * | 9/2013 | Mori | ......................... | H04L 9/14 713/193 |
| 2015/0281184 A1 * | 10/2015 | Cooley | ..................... | H04L 9/14 713/171 |

(Continued)

FOREIGN PATENT DOCUMENTS

WO WO 2020/053854 3/2020

OTHER PUBLICATIONS

International Search Report and the Written Opinion dated Jan. 7, 2020 From the International Searching Authority Re. Application No. PCT/IL2019/051011. (17 Pages).

(Continued)

*Primary Examiner* — Shin-Hon (Eric) Chen

(57) ABSTRACT

There is provided a method for computing an encrypted prediction in response to an encrypted query, comprising: obtaining an encrypted dataset comprising encrypted records for respective encrypted entities, each record storing encrypted parameter values of parameters and an associated indication of the respective entity, computing abnormality clusters according to the records of the encrypted dataset, wherein each of the abnormality clusters stores indications of entities of records of the encrypted dataset having mathematically significant common abnormal feature(s) that statistically differentiates records of the respective abnormality cluster from other records of the encrypted dataset, receiving a query comprising target indications of respective target entities associated with common feature(s), and analyzing the query according to the abnormality clusters to identify at least one encrypted result entity indication according to a likelihood of the encrypted result entity indication predicted to correlate to the common feature(s) at a future time interval.

41 Claims, 7 Drawing Sheets

(56) References Cited

U.S. PATENT DOCUMENTS

2016/0105402 A1* 4/2016 Soon-Shiong ...... H04L 63/0428
　　　　　　　　　　　　　　　　　　　　　　　　　　713/164
2017/0109852 A1* 4/2017 Ito ......................... G06F 21/32

OTHER PUBLICATIONS

Bos et al. "Private Predictive Analysis on Encrypted Medical Data", Journal of Biomedical Informatics, 50: 234-243, Aug. 2014.
Graepel et al. "ML Confidential: Machine Learning on Encrypted Data", International Conference on Information Security and Cryptology ICISC: Information Security and Cryptology: 1-21, 2012.

* cited by examiner

SYSTEMS AND METHODS FOR SECURE PREDICTION USING AN ENCRYPTED QUERY EXECUTED BASED ON ENCRYPTED DATA

FIELD AND BACKGROUND OF THE INVENTION

The present invention, in some embodiments thereof, relates to predictive analytics and, more specifically, but not exclusively, to systems and methods for generating a prediction based on an encrypted query executed based on encrypted data.

To make predictions based on records of data, organizations turn to powerful tools like data science and predictive analytics. Current state-of-the-art prediction tools employ machine learning algorithms that take raw data, learn the internal statistics and regularities within the data, and then attempt to either make future prediction based on the data.

SUMMARY OF THE INVENTION

According to a first aspect, a method for computing an encrypted prediction in response to an encrypted query, comprises: obtaining an encrypted dataset comprising a plurality of encrypted records for respective plurality of encrypted entities, each record storing encrypted parameter values of parameters and an associated indication of the respective entity, computing a plurality of abnormality clusters according to the records of the encrypted dataset, wherein each of the plurality of abnormality clusters stores indications of entities of records of the encrypted dataset having at least one mathematically significant common abnormal feature that statistically differentiates records of the respective abnormality cluster from other records of the encrypted dataset, receiving a query comprising a plurality of target indications of respective target entities associated with at least one common feature, analyzing the query according to the abnormality clusters to identify at least one encrypted result entity indication according to a likelihood of the encrypted result entity indication predicted to correlate to the at least one common feature at a future time interval, and providing, in response to the query, the at least one encrypted result entity indication.

According to a second aspect, a system for computing an encrypted prediction in response to an encrypted query, comprises: at least one hardware processor, and a non-transitory memory having stored thereon a code for execution by the at least one hardware processor, the code comprising instructions for: obtaining an encrypted dataset comprising a plurality of encrypted records for respective plurality of encrypted entities, each record storing encrypted parameter values of parameters and an associated indication of the respective entity, computing a plurality of abnormality clusters according to the records of the encrypted dataset, wherein each of the plurality of abnormality clusters stores indications of entities of records of the encrypted dataset having at least one mathematically significant common abnormal feature that statistically differentiates records of the respective abnormality cluster from other records of the encrypted dataset, receiving a query comprising a plurality of target indications of respective target entities associated with at least one common feature, analyzing the query according to the abnormality clusters to identify at least one encrypted result entity indication according to a likelihood of the encrypted result entity indication predicted to correlate to the at least one common feature at a future time interval, and providing, in response to the query, the at least one encrypted result entity indication.

According to a third aspect, a computer program product for computing an encrypted prediction in response to an encrypted query, comprises: a non-transitory memory having stored thereon a code for execution by at least one hardware processor, the code comprising instructions for: obtaining an encrypted dataset comprising a plurality of encrypted records for respective plurality of encrypted entities, each record storing encrypted parameter values of parameters and an associated indication of the respective entity, computing a plurality of abnormality clusters according to the records of the encrypted dataset, wherein each of the plurality of abnormality clusters stores indications of entities of records of the encrypted dataset having at least one mathematically significant common abnormal feature that statistically differentiates records of the respective abnormality cluster from other records of the encrypted dataset, receiving a query comprising a plurality of target indications of respective target entities associated with at least one common feature, analyzing the query according to the abnormality clusters to identify at least one encrypted result entity indication according to a likelihood of the encrypted result entity indication predicted to correlate to the at least one common feature at a future time interval, and providing, in response to the query, the at least one encrypted result entity indication.

At least some of the systems, apparatus, methods, and/or code instructions describe herein address the technical problem of securely computing predictions using a network connected prediction service operated by a third party accessed by multiple different clients terminals over the network. Prediction tools require contextual data that informs them which feature is which, and what is the actual numeric value for each feature. For example, to be able to predict future top user accounts, existing machine learning tools require to know which column in the dataset is the value of the transactions, who are the users involved and what was the actual value of the transaction. These types of machine learning and deep learning tools are prone to privacy breaches, as the tools themselves require sensitive information for learning.

At least some of the systems, apparatus, methods, and/or code instructions describe herein address the technical problem and/or improve the technical field of network security, in particular providing network security for predictions performed over a network in response to a query, by performing predictions using encrypted input data (also referred to herein as records, and/or encrypted parameter values). Encrypting the input data provides no identifiable data to the network node that is executing the prediction process, for example, no names of user of the user accounts, no identification of the user accounts, no values of transactions, and/or no names of data columns (also referred to herein as parameters). The use of entirely encrypted data (i.e., the encrypted parameter values, and optionally encrypted entity identifiers) provides a secure process that generates secure predictions. In contrast, previous prediction systems require context of the raw data, for example, headers of the meta-data, private information of the entities (e.g., user accounts, individuals), numeric and/or relational values.

Moreover, predictions are performed on the abnormality clusters computed based on the encrypted datasets, which provides another level of network security. Predictions are not performed on the raw data stored in the encrypted datasets, i.e., predictions are not performed on the encrypted parameter values. The abnormality clusters store indications of the entities associated with records of the encrypted datasets, where each record stores the encrypted parameter values. The abnormality clusters do not store encrypted parameter values of the encrypted dataset. Performing predictions based on the abnormality clusters, rather than on the encrypted dataset creates a separation between the computed predictions and the raw data. The predictions do not contain, and physically cannot contain, any of the raw data (i.e., the encrypted parameter values) stored by the encrypted dataset. To illustrate the fact that predictions do not store any of the raw data, a compression process may be executed on the raw data, and compared to compression of the abnormality clusters. The ratio between the compression results are indicative of the reduction in information, i.e. that information in the raw data is indeed discarded during the cluster generation of the clusters. The prediction results are unidentifiable to third parties, for example, user accounts corresponding to the prediction results cannot be determined. The prediction results may be decrypted by the originator of the query, for example, decrypted by a private key stored by the originator of the query.

Complete separation between the process of creation of the abnormality clusters and the prediction process, enables an additional physical layer of security. The raw data (i.e., encrypted parameter values of the encrypted dataset) may be stored at the user's local data storage device, for example, on a hard drive of the client terminal. Code for generating abnormality clusters may be executed by the client terminal for generating abnormality clusters storing encrypted indications of entities, for example, encrypted indications of user accounts. The set of abnormality clusters may be moved to another storage device (e.g., on a server) and used by other client terminals, which do not have access to any information regarding the raw data. Hence, the cluster-to-prediction process contains no identifiable data, with respect to the entities (e.g., user accounts) and/or the actual raw data used to generate the abnormality clusters, and may be safely and privately distributed to other devices for performing predictions. The resulting prediction output may then be securely sent back to the raw-data-holding client terminal, who is the only one that is able to decrypt the output prediction results using a private key.

At least some of the systems, apparatus, methods, and/or code instructions describe herein address the technical problem of generating unbiased prediction results in response to a query. For example, predictions performed by network connected prediction service operated by a third party accessed by multiple different clients' terminals over the network. Such prediction services are prone to biased predictions, since the predictions are only as good as the biased raw data that is supplied. Machine learning systems that generate predictions are biased based on their input, i.e. given a biased set of examples, their learned systems can only generate biased predictions.

At least some of the systems, apparatus, methods, and/or code instructions describe herein address the technical problem of efficiently improving accuracy of prediction results. At least some of the systems, apparatus, methods, and/or code instructions describe herein provide a technical solution to the technical problem by aggregating raw data from multiple sources. The raw data is not necessarily pre-processed and/or required to be provided in a certain format, but aggregated in its raw form. Since the raw data provided by multiple sources is encrypted, optionally using different encryption processes, none of the other sources is able to access the data provided by the other sources. The abnormality clusters are computed according to the aggregated raw data, and may be securely used by multiple different users to make predictions, since as described herein the abnormality clusters do not contain any of the raw data. The increase in accuracy of the predictions is at least based on the large amount of available raw data from multiple distinct sources.

At least some of the systems, apparatus, methods, and/or code instructions describe herein address the technical problem of efficiently improving accuracy of predicting actions to be performed in association with user accounts. For example, the ability to understand, predict and influence consumer behavior quickly may provide any business an unfair advantage over its competition. Smart business leaders have many ideas for influencing customer behavior to improve business performance. To implement them, they need to answer questions such as: "Who are our top customers and how do we acquire more of them?", "Who is likely to try this newly-launched product?".

In a further implementation form of the first, second, and third aspects, an automated process for execution in association with user accounts corresponding to respective at least one result entity indications is in response to receiving the at least one encrypted result entity indication.

In a further implementation form of the first, second, and third aspects, the automated process is executed by a client terminal that provided the query and that received the response to the query.

In a further implementation form of the first, second, and third aspects, the method further comprises and/or the system further comprises code instructions for and/or the computer program product further comprises additional instructions for receiving a plurality of encrypted search records for respective plurality of encrypted search entities, each search record storing encrypted search parameter values of search parameters and an associated indication of the respective encrypted search entity, adding the encrypted search records to the encrypted dataset to create an aggregated encrypted dataset storing an aggregation of records, wherein the encrypted search records are tagged for identification thereof, wherein the plurality of abnormality clusters are computed according to the aggregation of records of the aggregated encrypted dataset, wherein the query is analyzed according to the abnormality clusters to identify at least one encrypted search entity.

In a further implementation form of the first, second, and third aspects, the records of the encrypted dataset are associated with a timestamp within a historical time interval, wherein the encrypted search records are associated with a timestamp within the historical time interval, wherein the query includes target indications of respective target entities associated with at least one common feature associated with a timestamp within the historical time interval, wherein the at least one encrypted result entity indication is predicted to correlate to the at least one common feature at the future time interval.

In a further implementation form of the first, second, and third aspects, the abnormality clusters do not store encrypted parameter values.

In a further implementation form of the first, second, and third aspects, the abnormality clusters only store indications of entities.

In a further implementation form of the first, second, and third aspects, the at least one encrypted result entity indication does not correlate to the at least one common feature at a current and historical time interval prior to the future time interval.

In a further implementation form of the first, second, and third aspects, the abnormality clusters are computed according to different unique combinations of mathematically significant common abnormal features that statistically differentiate records of the respective abnormality cluster from other records of the encrypted dataset.

In a further implementation form of the first, second, and third aspects, the mathematically significant common abnormality feature that statistically differentiates records of the respective abnormality cluster from other records of the encrypted dataset is selected from the group consisting of: based on social physics laws, mathematical invariance, and graph-theoretic calculations.

In a further implementation form of the first, second, and third aspects, the method further comprises and/or the system further comprises code instructions for and/or the computer program product further comprises additional instructions for computing a multidimensional space according to candidate values of a plurality of sets of rules and/or mathematical functions, defining an abnormality region of the multidimensional space denoting abnormalities that violate the plurality of sets of rules and/or mathematical functions, the abnormality region denoting the at least one mathematically significant common abnormal features, mapping the records of the encrypted dataset into the multidimensional space by evaluating the records according to the plurality of sets of rules and/or mathematical functions, wherein the abnormality clusters are computed by clustering records mapped to the abnormality region of the multidimensional space.

In a further implementation form of the first, second, and third aspects, the mathematically significant common abnormality feature that statistically differentiates records of the respective abnormality cluster from other records of the encrypted dataset comprises: an abnormality requirement of a plurality of set of rules and/or a plurality of mathematical function, wherein the abnormality clusters are computed according to entity indications corresponding to records evaluated by the set of rules and/or at least one mathematical function that meet the abnormality requirement.

In a further implementation form of the first, second, and third aspects, the abnormality clusters are computed according to entity indications corresponding to records that violate the set of rules and/or a plurality of mathematical function according to the abnormality requirement.

In a further implementation form of the first, second, and third aspects, the abnormality requirement is selected to exclude noise from the abnormality cluster.

In a further implementation form of the first, second, and third aspects, the abnormality requirement is selected to exclude improbably normal records having extreme values from the abnormality cluster.

In a further implementation form of the first, second, and third aspects, the mathematically significant common feature that statistically differentiates records of the respective abnormality cluster from other records of the encrypted dataset comprises: calculation of a degree-distribution of sub-graphs generated from the records of the encrypted dataset, wherein nodes of each sub-graph represent respective entities of the records, wherein according to a mathematical invariance the sub-graphs degree-distribution obeys a scale-free power-law, identifying abnormal sub-graphs that violate the scale-free power-law degree-distribution, and creating the abnormality clusters according to the indication of entities of the records of each respective abnormal sub-graph.

In a further implementation form of the first, second, and third aspects, abnormality clusters overlap by including a same entity indication as a member of each of the overlapping abnormality clusters.

In a further implementation form of the first, second, and third aspects, the analyzing of the query according to the abnormality clusters is performed by: identifying a plurality of candidate abnormality clusters each having at least one matching entity indication that matches the target entity indication of the query, computing a score for each unique non-matching entity indication of the plurality of candidate abnormality clusters, the score indicative of a number of matching entity indications in the candidate abnormality clusters in which the respective unique non-matching entity indication is a member thereof, and providing at least one of the unique non-matching entity indications according to a ranking of the score thereof.

In a further implementation form of the first, second, and third aspects, the analyzing of the query according to the abnormality clusters is performed by: identifying a plurality of candidate abnormality clusters each having at least one matching entity indication that matches the target entity indication of the query, computing a score for each unique non-matching entity indication of the plurality of candidate abnormality clusters, the score indicative of a number of candidate abnormality clusters in which the respective unique non-matching entity indication is a member thereof that include at least one matching entity indications, and providing at least one of the unique non-matching entity indications according to a ranking of the score thereof.

In a further implementation form of the first, second, and third aspects, the encrypted dataset and the abnormality clusters are stored on distinct storage devices.

In a further implementation form of the first, second, and third aspects, access to the encrypted dataset is blocked upon creation of the abnormality clusters.

In a further implementation form of the first, second, and third aspects, the plurality of entities are associated with a plurality of user accounts, and the encrypted parameter values are computed based on interactive actions performed by the plurality of user accounts.

In a further implementation form of the first, second, and third aspects, the plurality of entities and corresponding plurality of encrypted parameter values are selected from the group consisting of: user accounts and transactions between user accounts, user social network accounts and interactive actions performed between social network accounts, financial user accounts and financial transfers between financial user accounts, blockchain user accounts and blockchain transactions between blockchain user accounts, user phone accounts and call data records between phones, user network login accounts and computer network access logs, and user email addresses and email messages sent between user email addresses.

In a further implementation form of the first, second, and third aspects, the plurality of encrypted parameter values further comprise additional data of a user associated with the respective user account.

In a further implementation form of the first, second, and third aspects, the additional data includes demographic data of the user.

In a further implementation form of the first, second, and third aspects, the plurality of encrypted parameter values further comprise a value indicative of a transaction between user accounts.

In a further implementation form of the first, second, and third aspects, metadata stored in the encrypted dataset indicative of a respective parameter for each respective parameter value is encrypted.

In a further implementation form of the first, second, and third aspects, the parameter values are encrypted according to an encryption process that maps a same value to a same encrypted target.

In a further implementation form of the first, second, and third aspects, indication of entities of the records clustered into abnormality clusters are encrypted.

In a further implementation form of the first, second, and third aspects, the encrypted dataset is created by aggregation of a plurality of encrypted sub-datasets, each comprising respective records including a respective combination of encrypted parameter values for a respective plurality of entities.

In a further implementation form of the first, second, and third aspects, each encrypted sub-dataset is encrypted with a respective unique encryption process, the encrypted dataset comprising parameter values encrypted with a plurality of respective unique encryption processes.

In a further implementation form of the first, second, and third aspects, the method further comprises and/or the system further comprises code instructions for and/or the computer program product further comprises additional instructions for filtering the abnormality clusters based on encrypted parameters of the parameter values to generate a sub-set of statistically unbiased abnormality clusters that adhere to predefined statistical thresholds indicative of unbiased data, wherein the query is analyzed according to the statistically unbiased abnormality clusters to provide at least one encrypted result entity indication that is statistically unbiased with respect to a random distribution.

In a further implementation form of the first, second, and third aspects, the method further comprises and/or the system further comprises code instructions for and/or the computer program product further comprises additional instructions for computing at least one statistical value for at least one parameter corresponding to each abnormality cluster according to the encrypted parameter values of the respective abnormality cluster, selecting at least one parameter according to the at least one statistical value, and wherein filtering comprises filtering the abnormality clusters according to the corresponding selected at least one parameter, wherein the provided at least one encrypted result entity indication is statistically unbiased with respect to the selected at least one parameter.

In a further implementation form of the first, second, and third aspects, the at least one statistical value is stored independently from the abnormality clusters.

In a further implementation form of the first, second, and third aspects, the at least one statistical value computed for each at least one parameter comprises a frequency and/or distribution of the encrypted parameter values of the records of the corresponding respective abnormality cluster.

In a further implementation form of the first, second, and third aspects, the sub-set of statistically unbiased abnormality clusters are selected from the abnormality clusters according to a probability that a distributed of encrypted parameter values of the selected at least one parameter is statistically similar to an expected random distribution of the selected at least one parameter.

In a further implementation form of the first, second, and third aspects, the method further comprises and/or the system further comprises code instructions for and/or the computer program product further comprises additional instructions for iteratively obtaining additional encrypted records, adding the additional encrypted records to the encrypted dataset, and iteratively computing the abnormality clusters.

In a further implementation form of the first, second, and third aspects, the abnormality clusters are computed directly according to raw data stored in the encrypted dataset without pre-processing of the raw data.

In a further implementation form of the first, second, and third aspects, pre-processing of the raw data includes at least one member of the group consisting of: sanitation, normalization, and noise removal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

Figure 1:
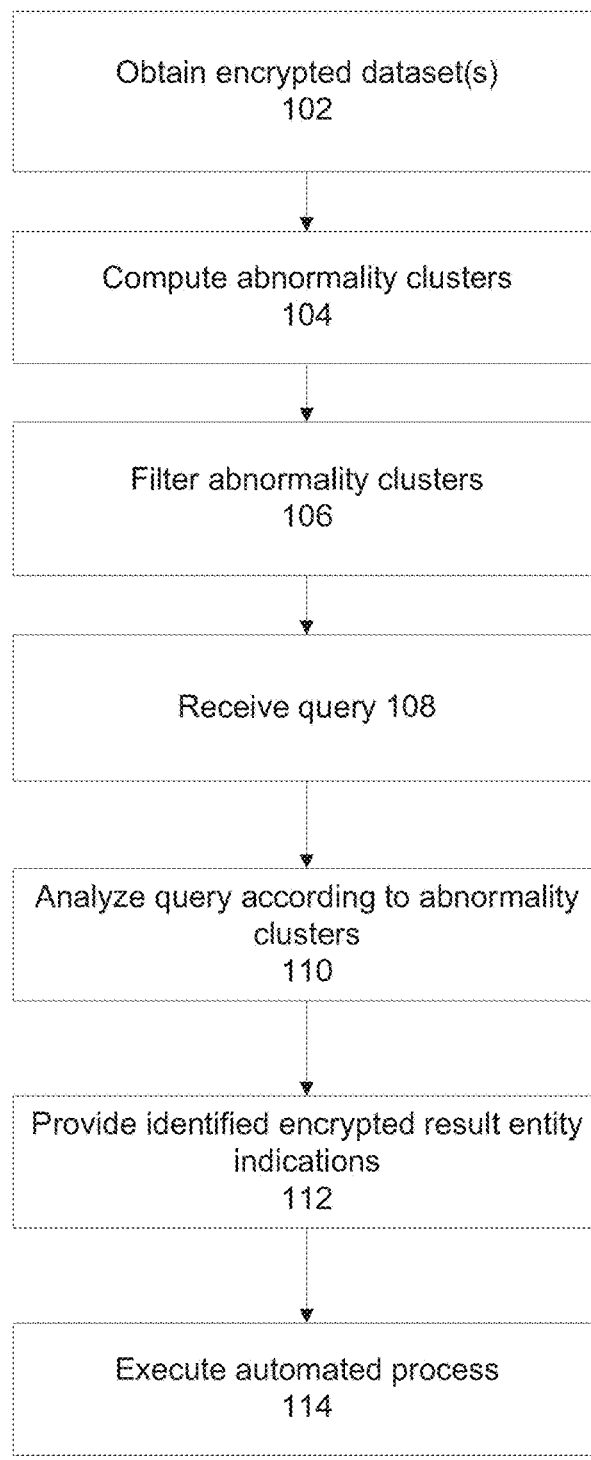
FIG. 1 is a is a flowchart of a method of computing an encrypted prediction in response to an encrypted query based on abnormality clusters computed according to an encrypted dataset, in accordance with some embodiments of the present invention.

The present invention, in some embodiments thereof, relates to predictive analytics and, more specifically, but not exclusively, to systems and methods for generating a prediction based on an encrypted query executed based on encrypted data.

An aspect of some embodiments of the present invention relates to systems, methods, an apparatus, and/or code instructions (stored on a data storage device executable by hardware processor(s)) for computing an encrypted prediction of one or more encrypted result entity indications (e.g., user accounts) in response to an encrypted query of target indications of target entities associated with one or more common features, for example, user accounts that all performed a certain action within a certain historical time interval. The prediction may be entirely encrypted, performed using an encrypted query on encrypted datasets of encrypted records of encrypted entities. Anonymity of the data of the datasets, and the data of the query is maintained during the prediction process. Each record stores encrypted parameter values and an indication of the respective entity. The prediction is performed by analyzing the query according to abnormality clusters computed according to the encrypted records of the encrypted datasets. Each of the abnormality clusters stores indications of entities of records of the encrypted dataset having at least one mathematically significant common abnormal feature that statistically differentiates records of the respective abnormality cluster from other records of the encrypted dataset. In other words, all of the members of each abnormality cluster share a common abnormal feature with respect to the rest of the records of the encrypted dataset that were not included in the respective cluster. Multiple abnormality clusters are created, where members of each cluster share one or more unique set of abnormal features. For example, all user accounts in a certain abnormality cluster performed the same abnormal action which was not performed by the other user accounts not included in the certain abnormality cluster. The prediction is performed for a likelihood of the encrypted result entity indication to correlate to the common feature(s) of the query at a future time interval, for example, target user accounts predicted to perform the certain action within the future time interval.

Optionally, an automated process is executed in association with the predicted encrypted result entities. For example, a message is sent to the user accounts regarding the predicted certain action.

Optionally, the abnormality clusters are filtered based on encrypted parameters of the parameter values to generate a sub-set of statistically unbiased abnormality clusters that adhere to predefined statistical thresholds indicative of unbiased data. The query is analyzed according to the statistically unbiased abnormality clusters to provide encrypted result entity indication(s) that are statistically unbiased with respect to a random distribution.

At least some of the systems, apparatus, methods, and/or code instructions describe herein address the technical problem of securely computing predictions using a network connected prediction service operated by a third party accessed by multiple different clients terminals over the network. Prediction tools require contextual data that informs them which feature is which, and what is the actual numeric value for each feature. For example, to be able to predict future top user accounts, existing machine learning tools require to know which column in the dataset is the value of the transactions, who are the users involved and what was the actual value of the transaction. These types of machine learning and deep learning tools are prone to privacy breaches, as the tools themselves require sensitive information for learning.

At least some of the systems, apparatus, methods, and/or code instructions describe herein address the technical problem and/or improve the technical field of network security, in particular providing network security for predictions performed over a network in response to a query, by performing predictions using encrypted input data (also referred to herein as records, and/or encrypted parameter values). Encrypting the input data provides no identifiable data to the network node that is executing the prediction process, for example, no names of user of the user accounts, no identification of the user accounts, no values of transactions, and/or no names of data columns (also referred to herein as parameters). The use of entirely encrypted data (i.e., the encrypted parameter values, and optionally encrypted entity identifiers) provides a secure process that generates secure predictions. In contrast, previous prediction systems require context of the raw data, for example, headers of the meta-data, private information of the entities (e.g., user accounts, individuals), numeric and/or relational values.

Moreover, predictions are performed on the abnormality clusters computed based on the encrypted datasets, which provides another level of network security. Predictions are not performed on the raw data stored in the encrypted datasets, i.e., predictions are not performed on the encrypted parameter values. The abnormality clusters store indications of the entities associated with records of the encrypted datasets, where each record stores the encrypted parameter values. The abnormality clusters do not store encrypted parameter values of the encrypted dataset. Performing predictions based on the abnormality clusters, rather than on the encrypted dataset creates a separation between the computed predictions and the raw data. The predictions do not contain, and physically cannot contain, any of the raw data (i.e., the encrypted parameter values) stored by the encrypted dataset. To illustrate the fact that predictions do not store any of the raw data, a compression process may be executed on the raw data, and compared to compression of the abnormality clusters. The ratio between the compression results are indicative of the reduction in information, i.e. that information in the raw data is indeed discarded during the cluster generation of the clusters. The prediction results are unidentifiable to third parties, for example, user accounts corresponding to the prediction results cannot be determined. The prediction results may be decrypted by the originator of the query, for example, decrypted by a private key stored by the originator of the query.

Complete separation between the process of creation of the abnormality clusters and the prediction process, enables an additional physical layer of security. The raw data (i.e., encrypted parameter values of the encrypted dataset) may be stored at the user's local data storage device, for example, on a hard drive of the client terminal. Code for generating abnormality clusters may be executed by the client terminal for generating abnormality clusters storing encrypted indications of entities, for example, encrypted indications of user accounts. The set of abnormality clusters may be moved to another storage device (e.g., on a server) and used by other client terminals, which do not have access to any information regarding the raw data. Hence, the cluster-to-prediction process contains no identifiable data, with respect to the entities (e.g., user accounts) and/or the actual raw data used to generate the abnormality clusters, and may be safely and privately distributed to other devices for performing predictions. The resulting prediction output may then be securely sent back to the raw-data-holding client terminal, who is the only one that is able to decrypt the output prediction results using a private key.

At least some of the systems, apparatus, methods, and/or code instructions describe herein address the technical problem of generating unbiased prediction results in response to a query. For example, predictions performed by network connected prediction service operated by a third party accessed by multiple different clients' terminals over the network. Such prediction services are prone to biased predictions, since the predictions are only as good as the biased raw data that is supplied. Machine learning systems that generate predictions are biased based on their input, i.e. given a biased set of examples, their learned systems can only generate biased predictions.

At least some of the systems, apparatus, methods, and/or code instructions describe herein address the technical problem of efficiently improving accuracy of prediction results. At least some of the systems, apparatus, methods, and/or code instructions describe herein provide a technical solution to the technical problem by aggregating raw data from multiple sources. The raw data is not necessarily pre-processed and/or required to be provided in a certain format, but aggregated in its raw form. Since the raw data provided by multiple sources is encrypted, optionally using different encryption processes, none of the other sources is able to access the data provided by the other sources. The abnormality clusters are computed according to the aggregated raw data, and may be securely used by multiple different users to make predictions, since as described herein the abnormality clusters do not contain any of the raw data. The increase in accuracy of the predictions is at least based on the large amount of available raw data from multiple distinct sources.

At least some of the systems, apparatus, methods, and/or code instructions describe herein address the technical problem of efficiently improving accuracy of predicting actions to be performed in association with user accounts. For example, the ability to understand, predict and influence consumer behavior quickly may provide any business an unfair advantage over its competition. Smart business leaders have many ideas for influencing customer behavior to improve business performance. To implement them, they need to answer questions such as: "Who are our top customers and how do we acquire more of them?", "Who is likely to try this newly-launched product?".

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
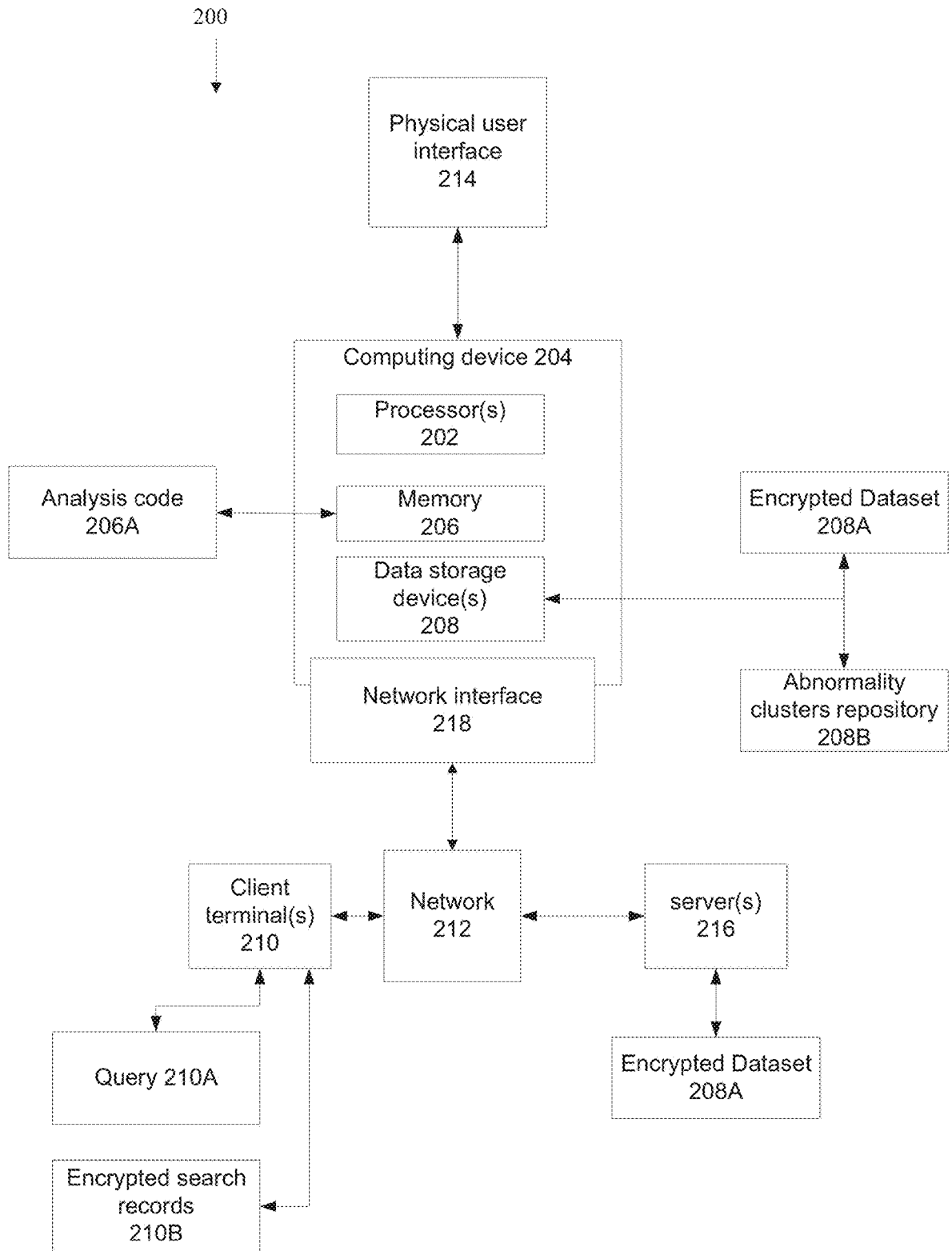
FIG. 2 is a block diagram of components of a system for computing an encrypted prediction in response to an encrypted query based on abnormality clusters computed according to an encrypted dataset, in accordance with some embodiments of the present invention.

Reference is now made to FIG. 1, which is a flowchart of a method of computing an encrypted prediction in response to an encrypted query based on abnormality clusters computed according to an encrypted dataset, in accordance with some embodiments of the present invention. Reference is also made to FIG. 2, which is a block diagram of components of a system 200 for computing an encrypted prediction in response to an encrypted query based on abnormality clusters computed according to an encrypted dataset, in accordance with some embodiments of the present invention. System 200 may implement the acts of the methods described with reference to FIG. 1, by processor(s) 202 of a computing device 204 executing code instructions (e.g., code 206A) stored in a memory 206 (also referred to as a program store).

Computing device 204 may be implemented as, for example one or more and/or combination of: a group of connected devices, a client terminal, a server, a virtual server, a computing cloud, a virtual machine, a desktop computer, a thin client, a network node, a network server executing code of a smart contract stored on a blockchain, and/or a mobile device (e.g., a Smartphone, a Tablet computer, a laptop computer, a wearable computer, glasses computer, and a watch computer).

Multiple architectures of system 200 based on computing device 204 may be implemented. For example:

Computing device 204 may be implemented as one or more servers (e.g., network server, web server, a computing cloud, a virtual server, a network node storing a blockchain and executing code of a smart contract stored on the blockchain) that provides services to multiple client terminals 210 over a network 212, for example, software as a service (SaaS), remote services, and/or services executed by a smart contract of a blockchain paid for by cryptocurrency.

Computing device 204 receives encrypted datasets from multiple client terminals 210 over network 212. An encrypted dataset 208A is generated by aggregating the multiple encrypted datasets obtained from client terminals 210. Abnormality clusters are created by computing device 204 from the data stored in encrypted dataset 208A and stored in abnormality cluster dataset 208B, as described herein. Queries are received from respective client terminal(s) 210 over network 212 and executed based on abnormality cluster dataset 208. The generated encrypted result entity indication is provided to the corresponding client terminal 210 over network 212.

In such implementation, encrypted dataset 208A includes datasets obtained from different client terminals 210, each of which may encrypt their respective datasets with different processes (e.g., different encryption keys, different hash algorithms), each dataset may include different parameters according to different formats, and/or be created by different applications.

Communication between client terminal(s) 210 and computing device 204 over network 212 may be implemented, for example, via an application programming interface (API), software development kit (SDK), functions and/or libraries and/or add-ons added to existing applications executing on client terminal(s), an application for download and execution on client terminal 210 that communicates with computing device 204, function and/or interface calls to smart contract code of a blockchain executed by computing device 204, a remote access section executing on a web site hosted by computing device 204 accessed via a web browser executing on client terminal(s) 210.

Encrypted dataset 208A and abnormality cluster dataset 208B may be stored on distinct data storage devices, optionally on data storage devices physically located at different locations, connected to one another by network 212. For example, encrypted dataset 208A may be stored on a server 216 and/or on client terminal 210. Abnormality clusters are locally computed by code executing on server 216 and/or on client terminal 210, and/or that are computed by computing device 204 accessing remotely stored encrypted dataset 208A. The computed abnormality clusters are stored in abnormality cluster dataset 208B.

Computing device 204 may be implemented as a stand-alone device (e.g., kiosk, client terminal, smartphone, server, computing cloud, virtual machine) that includes locally stored code that implement one or more of the acts described with reference to FIG. 1. For example, code loaded on to an existing computing device that executes an application that generates the dataset of records, and/or code loaded onto a dedicated server (e.g., of a same organization) that is connected to client terminal 210 via network 212, where only client terminal 210 (or other client terminals 210 of the same organization) store and/or generate the dataset of records. In such implementation, the dataset includes records of a common format, which may be generated by the same application, for the same organization. The records may be encrypted using the same encryption process (e.g., same encryption key, same hash algorithm).

Hardware processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Memory 206 stores code instructions executable by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code 206A that implements one or more features and/or acts of the method described with reference to FIG. 1 when executed by hardware processor(s) 202.

Computing device 204 may include data storage device(s) 208 for storing data, for example, encrypted dataset 208A and/or abnormality clusters repository 208B that stores computed abnormality clusters. Data storage device(s) 208 may be implemented as, for example, a memory, a local hard-drive, virtual storage, a removable storage unit, an optical disk, a storage device, and/or as a remote server and/or computing cloud (e.g., accessed using a network connection).

Network 212 may be implemented as, for example, the internet, a local area network, a virtual network, a wireless network, a cellular network, a local bus, a point to point link (e.g., wired), and/or combinations of the aforementioned.

Computing device 204 may include a network interface 218 for connecting to network 212, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 and/or client terminal(s) 210 and/or server(s) 216 include and/or are in communication with one or more physical user interfaces 214 that include a mechanism for user interaction, for example, to enter the query, and/or view the prediction results provided in response to the query. Exemplary physical user interfaces 214 include, for example, one or more of, a touchscreen, a display, gesture activation devices, a keyboard, a mouse, and voice activated software using speakers and microphone.

Client terminal(s) 210 and/or server(s) 216 may be implemented as, for example, as a desktop computer, a server, a virtual server, a network server, a web server, a virtual machine, a thin client, and a mobile device.

Referring now back to FIG. 1, at 102, one or more encrypted datasets are obtained. Encrypted datasets may be obtained from multiple client terminal(s) 210 and/or multiple server(s) 216, which may be associated with different entities which may be unrelated to one another. Each client terminal 210 and/or server 216 may provide one or more encrypted datasets. Encrypted dataset(s) may be stored by computing device 204 as encrypted dataset(s) 208A.

Each encrypted dataset includes multiple encrypted records for respective encrypted entities. Each record stores encrypted values of parameters (also referred to herein as encrypted parameter values), and an associated indication of the respective entity. It is noted that the encrypted entities may be represented by a non-encrypted identification code (e.g., ID number) which is referred to as encrypted since the actual identity of the entity based on the non-encrypted identification code alone. Entities may represent, for example, virtual and/or physical entities used by individuals (i.e., human users), for example, user accounts (e.g., social network accounts, bank accounts, shopping accounts, email accounts, gaming application, wallets, and blockchain user accounts), client terminals, smartphone (and/or standard phones), servers, and applications being used by the user (e.g., email application, game application, online shopping application, banking application, currency transfer application). The entities may be encrypted such that there is not identifiable information regarding the actual identity of the entities.

An example of encrypted records stored by an encrypted dataset is transactions, for example, sending of multimedia objects (e.g., images, videos, text) from one user to another, a phone call by an originating entity to a receiving entity, adding another entity (e.g., user account) to a social network of a current entity, a game being played by two or more entities, an email or other message sent from one entity to another entity, transactions associated with a smartcontract of a blockchain, and financial transactions (e.g., transfer of currency from one entity to another entity). Each transaction is stored as a record. Each exemplary transaction record stores: an encrypted ID of the transaction participants, for example sender and receiver (e.g., seller and buyer, or originator of multimedia object and receiver of the multimedia object, entity that added another entity as a link to their social network), an encrypted (e.g., hashed) value of the transaction, and optionally additional encrypted metadata of the entities (e.g., of the human individuals associated with the entities), for example gender, age, income, geographic location, and ethnicity. The header of the meta-data, referred to herein as parameters (e.g., "gender", "age") may be encrypted, as well as the parameter value itself (e.g. "male", "female").

The encryption of the dataset increases privacy and/or security of the downstream computations, since there is no identifiable information regarding the entities (e.g., individuals), nor the related data.

The encrypted dataset (e.g., each encrypted dataset) may be stored as a table, array, comma separated text, and/or other format. Metadata stored in the encrypted dataset indicative of a respective parameter for each respective parameter value may encrypted, for example, when records are stored as rows of a table, where each column is a respective parameter and each cell stores a respective parameter value, the heading of the columns may be encrypted.

Each encrypted dataset may be encrypted using a different encryption mechanism (e.g., using a different encryption key), which may only be known to the respective client terminal and/or server that provided the encrypted dataset. Each encrypted dataset may be locally encrypted by the respective client terminal and/or server. The computing device and/or other client terminals and/or other servers may not necessarily be aware of the encryption process of other client terminals and/or servers and/or may not necessarily have the ability to perform decryption of the dataset encrypted by other client terminals and/or servers. Alternatively, common encryption mechanisms may be used by different client terminals and/or servers. For example, the same encryption key is provided to multiple client terminals and/or servers for encryption of their respective datasets.

The encrypted data (e.g., parameter values) stored in respective encrypted dataset(s) is encrypted according to an encryption process that maps a same value to a same encrypted target. Each parameter value and/or parameter is encrypted individually to generate a corresponding encrypted parameter value, for example, cells of a table that each store a respective parameter value are individually encrypted, and/or headers of the table (i.e., parameters) may be individually encrypted. For example, for the same encrypted dataset, the value "STUDENT" always maps to the value "H873js!". It is noted that different encrypted dataset may use different encryption mechanisms, in which case the value "STUDENT" always maps to different constant values in the different encrypted datasets. For example, for a first encrypted dataset, the value "STUDENT" always maps to the value "H873js!", and for a second encrypted dataset, the value "STUDENT" always maps to the value "k38#GH".

Encryption may be performed, for example, by a hashing process that computes a hash value for a given input value.

Each encrypted dataset may store different unencrypted data, such as different records of different entities storing different values of different parameters. For example, one encrypted dataset may store records of phone calls, and another encrypted dataset may store records of transactions made via bank accounts. Each client terminal and/or server may only be aware of the contents of its own encrypted dataset, and unaware of the contents of encrypted datasets provided by other client terminals and/or servers.

The computing device that obtains the encrypted datasets from multiple client terminals and/or servers may be entirely blind as to the contents of the encrypted datasets and/or blind to the encryption mechanism used to encrypt the datasets. The computing device may be unaware of the records, the entities, and/or the parameter values stored in the encrypted datasets.

The received encrypted datasets may be aggregated into a single encrypted dataset. The single encrypted dataset is created by aggregation of multiple encrypted sub-datasets, each including respective records including a respective combination of encrypted parameter values for respective entities. Each encrypted sub-dataset may be encrypted with a respective unique encryption process. The aggregated single encrypted dataset may include parameter values encrypted with respective unique encryption processes. As used herein, the term encrypted dataset may refer to the aggregation of multiple encrypted sub-datasets obtained from different client terminals and/or servers.

Optionally, the entities of the encrypted dataset are associated with user accounts. Each entity is linked to a real human user. The encrypted parameter values may be computed based on interactive actions performed by the user accounts. The encrypted parameter values may represent actions (e.g., indicative of behavior) performed by the real human users via the user accounts. Exemplary entities and corresponding encrypted parameter values include: user accounts and transactions between user accounts, user social network accounts and interactive actions performed between social network accounts, financial user accounts and financial transfers between financial user accounts, blockchain user accounts and blockchain transactions between blockchain user accounts, user phone accounts and call data records between phones, user network login accounts and computer network access logs, and user email addresses and email messages sent between user email addresses. Encrypted datasets including entities and encrypted parameter values of multiple different types are aggregated into a single encrypted dataset for further processing. The different encrypted datasets may be received, for example, from different and/or multiple bank servers, social networking servers, financial account servers, blockchain servers, phone account servers, network administration servers, and/or email servers.

Optionally, the encrypted parameter values of the encrypted dataset include additional data of users associated with the respective user account. Exemplary additional data may include demographic data of the user, for example, age, geographical location, gender, and income.

Alternatively or additionally, the encrypted parameter values include value(s) indicative of a transaction between user accounts.

Optionally, a search encrypted dataset including encrypted search records for respective encrypted search entities is obtained. The search encrypted dataset defines the set of records of which the associated entities are provided in response to the query, as described herein. Each encrypted search record storing encrypted search parameter values of search parameters and an associated indication of the respective encrypted search entity. The search encrypted dataset is provided to the computing device by respective client terminals and/or servers.

Optionally, each encrypted dataset provided by respective client terminals and/or servers is labeled as the search encrypted dataset. The labeling may be implicit (i.e., no labeling) or explicit, for example, each encrypted dataset is tagged with an indication of the originating client terminal and/or server. When a query is received from the respective client terminal and/or servers, matching entities obtained from records of the labeled datasets provided by the originating client terminal and/or server are provided in response, as described herein. Alternatively, the search encrypted dataset may be explicitly labeled for search, for example, by tagging the encrypted search records as search records. Such implementation may be used, for example, when encrypted datasets for searching are provided in addition to encrypted datasets that are not for searching.

The encrypted search records are added (e.g., aggregated) to the encrypted dataset to create an aggregated encrypted dataset storing an aggregation of records. The encrypted search records are tagged for identification thereof, optionally according to originating client terminal and/or server, such that responses to a query are provided according to the originating client terminal and/or server.

The abnormality clusters are computed according to the aggregation of records of the aggregated encrypted dataset (i.e., the encrypted dataset), which are obtained from different originating client terminals and/or servers, as described herein. The query is analyzed according to the abnormality clusters computed from the aggregated encrypted dataset to identify encrypted search entity, according to the originator of the query, as described herein. For example, a bank server and an airline server provided their respective encrypted search records, which are added to the encrypted dataset. The search records are labeled according to their originating server. The encrypted dataset which stores records from both the bank and airline server are processed to compute the abnormality clusters, as described herein. Queries from the bank server are processed as described herein to identify entities originating from the bank server, which are provided back to the bank server in response. Queries from the airline server are processed as described herein to identify entities originating from the airline server, which are provided back to the airline server in response.

Optionally, the records of the encrypted dataset are associated with a timestamp within a historical time interval. The encrypted search records may be associated with a timestamp within the historical time interval. The query may include target indications of respective target entities associated with common feature(s) associated with a timestamp within the historical time interval. In such implementation, the response to the query may include indication(s) of encrypted result entity/entities predicted to correlate to the common feature at a future time interval. For example, the query includes a set of user accounts that all performed a certain action within the historical time interval. The response to the query includes a set of entities of user accounts that are predicted to perform the certain action at the future time interval.

At 104, abnormality clusters are computed according to the records of the encrypted dataset (i.e., the single aggregated encrypted dataset that includes records obtained from different originating client terminals and/or servers). The abnormality clusters are computed such that each abnormality cluster stores indications of entities of records of the encrypted dataset having one or more mathematically significant common abnormal features that statistically differentiates records of the respective abnormality cluster from other records of the encrypted dataset. Exemplary mathematically significant common abnormality feature(s) that statistically differentiates records of the respective abnormality cluster from other records of the encrypted dataset include: based on social physics laws, mathematical invariance, and/or graph-theoretic calculations.

It is noted that the abnormality clusters do not necessarily store any of the encrypted parameter values of the encrypted dataset. The abnormality clusters store indications of entities, optionally only store indications of the entities. The abnormality clusters are computed according to the encrypted parameter values of the records of the encrypted dataset, but store the indications of the entities of the records associated with the encrypted parameter values.

Optionally, the abnormality clusters are computed according to different unique combinations of mathematically significant common abnormal features that statistically differentiate records of the respective abnormality cluster from other records of the encrypted dataset.

Optionally, the abnormality clusters are computed directly according to raw data stored in the encrypted dataset (i.e., the encrypted parameter values) without pre-processing of the raw data, for example, without performing sanitation, normalization, and/or noise removal of the raw data. The raw data may denote the encrypted records as they were obtained by the computing device from the originating client terminal(s) and/or server(s).

Optionally, the encrypted dataset and the abnormality clusters are stored on distinct storage devices. For example, the encrypted dataset may be stored on respective client terminals and/or servers, and the abnormality clusters may be stored on the computing device. In another example, the encrypted dataset may be stored on the computing device, and the abnormality clusters may be stored on respective client terminals and/or servers. The encrypted dataset and the abnormality clusters may be stored on different computing devices to increase security. Access to the encrypted dataset may be blocked upon creation of the abnormality clusters, for example, access to the encrypted dataset to the computing device and/or other devices is prevented. Since the abnormality cluster does store any of the raw data (i.e., encrypted parameter values) of the encrypted dataset, once the abnormality clusters are created, the encrypted dataset is no longer needed to process queries. The abnormality clusters may be stored at a different location to provide processing of queries, while blocking access to the encrypted dataset.

Optionally, abnormality clusters overlap by including a same entity indication as a member of each of the overlapping abnormality clusters. For example, the same entity may be a member of multiple abnormality clusters.

Optionally, indications of entities of the records stored by the abnormality clusters are encrypted. The encryption may be an explicit encryption process, or an implicit "encryption" in which the actual entities are represented by an identification code from which the actual entity cannot be derived. The actual entity may be determined by the originating client terminal and/or server, for example, according to an internal mapping between actual entities and code. For example, bank account numbers are represented according to another numbering system, or names of users are represented by a numbering system.

The abnormality clusters may be computed according to one or more processes. One exemplary process is based on computation of a "knowledge sphere". Conceptually, records within the knowledge sphere are abnormal (i.e. which are clustered into the abnormality clusters), and records located outside of the knowledge sphere are normal. In more detail: A multidimensional space is defined according to candidate values of sets of rules and/or mathematical functions. For example, the multidimensional space may be computed according to the parameters, where each distinct parameter represents one dimension, and encrypted values of the respective parameter define the span of the dimension. For example, for phone call records having a parameter of destination phone number and call length (in the unencrypted state), the possible values of destination phone numbers of possible values of call length represent two spans of two dimensions. It is noted that the space may be defined according to the encrypted parameters and encrypted parameter values. An abnormality region of the multidimensional space is defined. The abnormality region denotes abnormalities that violate the sets of rules and/or mathematical functions. For example, calls below 10 seconds, or calls above 5 hours are abnormal. The abnormality region denotes the mathematically significant common abnormal feature(s) described herein. The records of the encrypted dataset are mapped into the multidimensional space by evaluating the records according to the sets of rules and/or mathematical functions. The abnormality clusters are computed by clustering records mapped to the abnormality region of the multidimensional space. Only indications of the entities of the records may be retained to define the abnormality cluster(s).

In another exemplary process, on a conceptual level, the abnormality clusters are defined based on threshold(s) of function(s) that define what is abnormal. In additional detail, the mathematically significant common abnormality feature(s) that statistically differentiates records of the respective abnormality cluster from other records of the encrypted dataset is implemented as an abnormality requirement of set of rules and/or mathematical function. The abnormality clusters are computed according to entity indications corresponding to records evaluated by the set of rules and/or mathematical function(s) that meet the abnormality requirement. The abnormality clusters are computed according to entity indications corresponding to records that violate the set of rules and/or violate the mathematical function(s) according to the abnormality requirement.

Optionally, noise is excluded from the abnormality clusters, for example, according to a noise requirement. The abnormality requirement may be selected to exclude noise from the abnormality cluster. For example, a predefined estimated noise requirement indicating an amount of noise, is excluded from the abnormality cluster, for example, 95%, or 95%, or 99% or 100% of noise is excluded. The abnormality requirement may be selected to define all noise as "normal" such that the abnormality clusters do not include noise (within the defined noise requirement). Exclusion of noise may increase the accuracy that the abnormality clusters include only (or mostly according to the noise requirement) "real" abnormalities.

Alternatively or additionally, extremely unlikely normal records are excluded from the abnormality clusters, for example, according to an improbability requirement. The abnormality requirement may be selected to exclude improbably normal records having extreme values from the abnormality cluster, for example, according to the improbability requirement.

In another exemplary process, the abnormality clusters are defined according to the mathematically significant common feature that statistically differentiates records of the respective abnormality cluster from other records of the encrypted dataset. A degree-distribution of sub-graphs generated from the records of the encrypted dataset is calculated. Nodes of each sub-graph represent respective entities of the records. According to a mathematical invariance, the sub-graphs degree-distribution obeys a scale-free power-law. Abnormal sub-graphs that violate the scale-free power-law degree-distribution are identified, for example, a full clique. The abnormality clusters are computed according to the indication of entities of the records of each respective abnormal sub-graph.

Optionally, acts 102-104 are dynamically iterated for dynamically updating of the abnormality clusters. Additional encrypted records may be received and added to the encrypted dataset to generate an updated encrypted dataset. The abnormality clusters are updated according to the updated encrypted dataset.

An exemplary process for computing the abnormality clusters is now described in terms of mathematical representation. The law, for which violations thereof are identified, where the violations are clustered into the abnormality clusters, may be mathematically denoted as:

$$L_{X,T}(d)=C$$

Where:

d may be represented as d(x,t) denoting a temporal data stream where x denotes a single data point and t denotes a timestamp of the data point.

L denotes a law operator that transforms the raw data d into a law representation where:

$$L_{X,T}(d) = \frac{1}{|X||T|} \int_X \int_T L(d(x,t)) dx dt$$

The Law itself is formulated as an equation that equates the Law Operator to an a-priori constant C (which can be a number, a distribution class, such as a Power Law, etc.). C denotes the invariant represented by the Law.

Given the explicit formulation of the Law, local deviations from the law may be validated by measuring deviation from the law, denoted by 4, as follows:

$$\xi(\Delta x, \Delta t) = L_{\Delta x, \Delta t}(d) - C$$

Where:

$\Delta x$ denotes a subspace of X, $\Delta t$ denotes a temporal window.

The deviation may be calculated for every subspace of X and any period of time, and generates a measure of how much that subspace violates the Law, during the given time period. By comparing the measure to a pre-defined threshold denoted $\xi_{threshold}$ the subspaces that violate the Law may be detected based on the following relationship:

$$r(\Delta t) = \{\Delta x : |\xi(\Delta x, \Delta t)| > \xi_{threshold}\}$$

The violation threshold $\xi_{threshold}$ may be selected such that the spontaneous emergence of a signal that would defer from the Law further than the threshold is highly improbable (e.g., according to a defined probability threshold). Automatic verification that a certain data subset is a violation of a Law may be performed, with a high-enough statistical significance, without any prior knowledge of the semantics of the data itself.

It is noted that as the signal changes both in time and space, different temporal windows may create different subspaces that are detected as Law Violations. Pre-defined fixed set of temporal windows may be used (derived from the Laws and not from the data) for example: $\Delta t$=1-day, 7-days, 30-days, 90-days.

When the data is highly dynamic, the longer temporal windows are unlikely to generate any deviation groups. When the data is static, the shorter temporal windows are unlikely to generate any deviation groups. Regardless, none of the windows is likely to generate "junk-groups", because by definition defined herein—noise cannot generate a consistent Law Violation (or in more formal terms, the probability that noise will generate a large enough violation of the Law, is close to zero, when this is the way the threshold $\xi_{threshold}$ is selected).

The Knowledge Sphere denotes an aggregation of all group deviations from all Laws, for all relevant temporal windows. The Knowledge Sphere may be mathematically represented as:

$$K_{sphere} = \{r(\Delta t) : \forall \Delta t, L\}$$

The Knowledge Sphere may be calculated once per data-set, as the calculation process is unaffected by the received queries, but rather the internal behavioral structure originating from the raw data. Conceptually, the abnormality clusters compress anonymous raw data into relevant canonical representations.

An example is now provided. In this example (x, t) abstractly represents a graph with x being the graph's nodes. The Law Operator is the degree-distribution operator, formulated as:

$$L(x) = l_n(x) = \begin{cases} 1 & x \text{ has degree } n \\ 0 & \text{otherwise} \end{cases}$$

This vector operator generates 1 for the degree of each node. The summation of the result of this operator over all the graph's nodes yields a cardinality vector for the graph's degrees (equivalent to the degrees distribution, when dividing by the number of nodes).

In this example it is assumed that the graph is a Scale-Free network. Therefore a Law Constant that assumes the power-law degree distribution can be applied (for some normalization constant α):

$$\overline{C} = c_n = \alpha \cdot n^{-\gamma}$$

The Law Constant may be formulated as:

$$L_{X,T;n}(d) = \frac{1}{|X||T|} \int_X \int_T L_n(d(x,t)) dx dt = C_n$$

The Law implies that the overall graph should obey a power law distribution of the degrees of all its node. However, in many large real-world scale-free graphs there could be significant local deviations from such distribution. This may occur for example around cliques (i.e. fully connected sub-graphs) or chains (i.e. sub-sets of the nodes that form a connected tree with no node having more than 2 neighbors).

Figure 7:
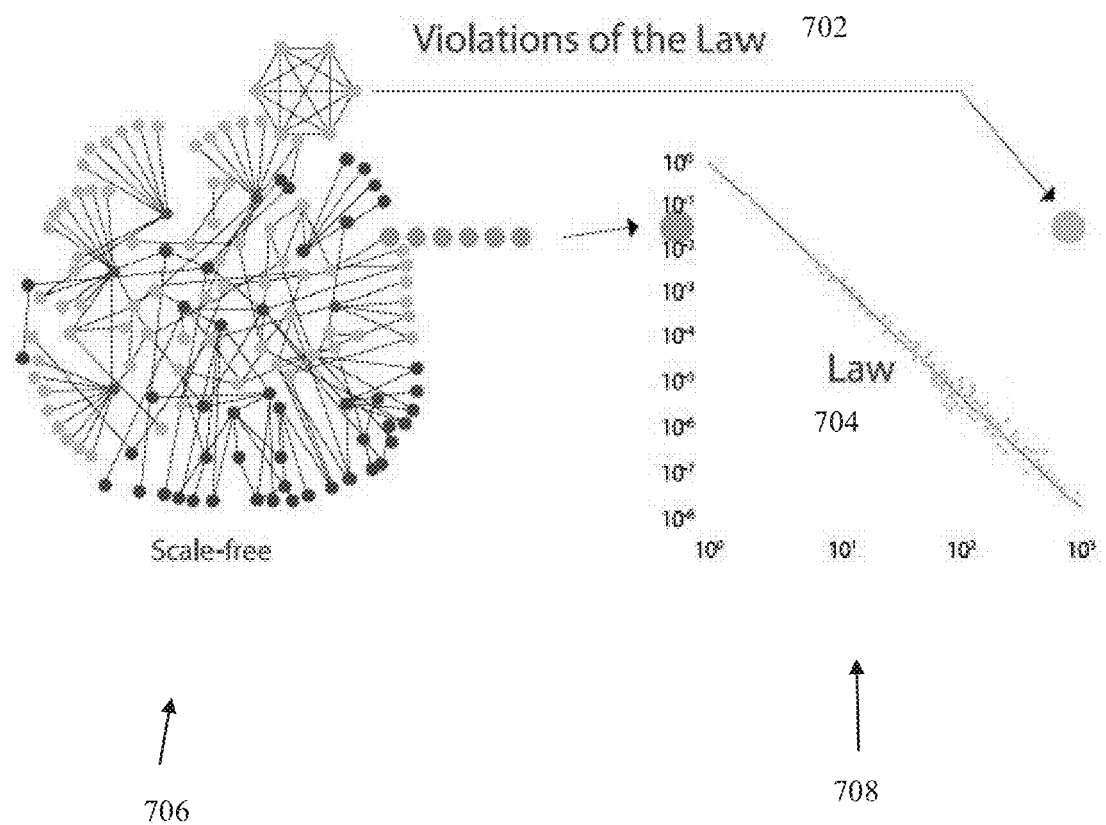
FIG. 7 is a schematic depicting deviation, and/or violations of a law applied to a scale free network, in accordance with some embodiments of the present invention.

Reference is now made to FIG. 7, which is a schematic depicting deviation, and/or violations 702 of a Law 704 applied to a scale free network 706, in accordance with some embodiments of the present invention. Manifestation of the deviation and/or violations are shown with reference to scale free network 706 (i.e., a structural representation) and as an adjacency matrix 708.

Given the Law, violations may be validated by a variety of measures, for example:

$$\xi(\Delta x, \Delta t) = \sum_n |L_{\Delta x, \Delta t;n}(d) - C_n|^2$$

The deviation measures the cumulative square of the differences (whereas another example for such measure may be the KL-divergence of both probability distributions). In the present example, Δx represents all possible subgraphs of the graph. Scanning all possible subgraphs in an input graph is not feasible, as it is a member of a class of "difficult problems" known as "Non-Polynomial Hard problems". It is noted that validating a Law Violation (that requires knowing the details of the Law) and is distinguished from detecting a Law Violation (that requires a set of proprietary techniques that are specifically developed for each Law).

Returning to the scale-free example, assuming an efficient technique for finding such local interferences in graphs would have resulted in a collection of sub-graphs that may be formulated as follows:

$$r(\Delta t) = \{\Delta x : |\xi x, \Delta t)| > \xi_{threshold}\}$$

The Knowledge Sphere implied by the Law is denoted as:

$$K_{sphere} = \{r(\Delta t) : \forall \Delta t, L\}$$

It is noted that different temporal windows can generate different Knowledge Spheres, representing very different associations among the graph nodes.

At 106, the abnormality clusters may be filtered. The filtering is performed to increase the accuracy (e.g., guarantee) statistically unbiased predictions. The filtering may be performed based on selected parameters of the encrypted dataset (which may be encrypted), for example, selected by a user. For example, the user selects the "gender" parameter.

The subset of abnormality clusters that adhere to statistical thresholds of unbiased data, e.g., Pearson-correlation, are selected. For example, the probability that the distribution of encrypted parameter values in computed statistics for the selected parameter(s) is not significantly different than a random distribution. Abnormality clusters that violate the hypothesis are ignored, i.e., abnormality clusters having statistical value that indicate that the respective abnormality clusters are significantly different than random (i.e., biased). In other words, the query may be analyzed based on filtered abnormality clusters that are statistically guaranteed to be unbiased with respect to the user-selected parameters.

The filtering may be based on selected encrypted parameters of the encrypted dataset. For example, the user may select parameters such as "age" and "gender" for whom unbiased predictions are statistically accurate (e.g., statistically guaranteed). The filtering generates a sub-set of statistically unbiased abnormality clusters that adhere to predefined statistical thresholds indicative of unbiased data. The query is analyzed (as described herein) according to the statistically unbiased abnormality clusters to provide encrypted result entity indication(s) that is statistically unbiased with respect to a random distribution.

The encrypted parameters for filtering the abnormality clusters may be selected as follows: statistical value(s) for parameter(s) corresponding to each respective abnormality cluster are computed according to the encrypted parameter values of the respective abnormality cluster. The statistical value(s) may be stored in association with each abnormality cluster, for example, in the data structure storing the abnormality cluster, and/or in a data structure that maps statistical values to abnormality clusters. The statistical values are computed based on the encrypted parameter values of records corresponding to the entities of the abnormality clusters. Exemplary statistical value(s) computed for each parameter include frequency, histogram, and/or distribution of the encrypted parameter values of the records of the corresponding respective abnormality cluster. For example, for an abnormality cluster including a set of 100 encrypted entity ids (e.g., of users), for the encrypted meta-data parameter "gender" the statistics generated are for apparent encrypted values of "male", "female", "other". The results including, for example, 20 "male", 75 "female" and 5 "other". It is noted that the header of the meta-data (i.e., parameter) may be encrypted and/or the parameter values. Moreover, it is noted that the statistical values cannot be back-traced to specific entities, for example, there is no information to tell which individual entity id is "male" or "female". Hence, the statistical values computed for each abnormality cluster maintain and/or reinforce the secure computation. One or more of the parameter are selected according to the statistical value(s). Selection may be performed, for example, manually by a user (e.g., that provides the query) via a GUI that presents candidate parameters and corresponding statistical values for selection thereof. Selection may be performed automatically based on code that analyzes the parameters and corresponding statistical values and performs the selection based on a set of rules or other automated selection process. The abnormality clusters are filtered according to the corresponding selected parameter. The filtering of the abnormality clusters may be performed by selecting the sub-set of statistically unbiased abnormality clusters from the abnormality clusters according to a probability that a distribution of the encrypted parameter values of the selected parameter(s) is statistically similar to an expected random distribution of the selected parameter(s), where the random distribution is defined as an unbiased distribution. Abnormality clusters that are statistically similar to a random distribution of the selected parameters are retained. Abnormality clusters that are statistically different from random distribution of the selected parameters are excluded. The remaining clusters represent unbiased data. The encrypted result entity (or entities) indication(s) provided in response to the query (as described herein) is/are statistically unbiased with respect to the selected parameter(s).

Optionally, the statistical value(s) is stored independently from the abnormality clusters.

At 108, a query is received. The query may be provided to the computing device by client terminals and/or servers. The query includes multiple target indications of respective target entities associated with one or more common features. For example, a list of user account IDs that all performed a certain action.

An exemplary use case, is a query to answer a question "given a list of accounts of people who took a loan, find other accounts of people who will also take a loan".

At 110, the query is analyzed according to the abnormality clusters, to identify one or more encrypted result entity indications according to a likelihood of the encrypted result entity indications predicted to correlate to the common feature(s) at a future time interval. Alternatively or additionally, the query is analyzed to identify one or more encrypted result entity indications of entities that currently share the common feature(s), such as during the historical time interval. For example, a list of additional user account IDs that are predicted to be likely to perform the certain action at the future time interval, where the certain action is the same action as performed by the user account IDs of the query.

Optionally, the encrypted result entity indication does not correlate to the common feature (of the query) at a current and/or historical time interval prior to the future time interval. For example, the entity indication is not currently displaying the action and/or has not previously displayed the action, but is predicted to perform the action in the future.

It is noted that the actual identity of the entities (e.g., individuals) is irrelevant to the computing device analyzing the query using the abnormality clusters. The analysis is performed according to the indications of the entities, such as IDs, optionally encrypted.

The analysis of the query according to the abnormality clusters may be performed based on one or more methods. For example, briefly and conceptually, computing for each of the entities a score which represents how many listed entities share their abnormality cluster. An entity (e.g., individual user account) who shares many clusters with the entities in the query generates a higher score than another entity that appears in abnormality clusters which contain no entities of the query.

In one exemplary analysis method described in additional detail, multiple candidate abnormality clusters are identified, where each candidate abnormality cluster includes one or more matching entity indications that match one or more of the target entity indications of the query. For example, the query includes a list of user account IDs. Each candidate abnormality cluster includes one or more of the user account IDs of the query. A score is computed for each unique non-matching entity indication of the candidate abnormality clusters. The score is indicative of a number of matching entity indications in the candidate abnormality clusters in which the respective unique non-matching entity indication is a member thereof. For example, the query includes user accounts A1 and A2. Three candidate abnormality clusters are identified, the first candidate abnormality cluster includes A1, and second includes both A1 and A2, and the third includes only A2. The first, second, and third clusters include user account B1. B1 is assigned a score of 4, since the candidate clusters in which it is located match to 4 user accounts of the query (i.e., A1; A1 and A2; A2). The first and second clusters include user account B2. B2 is assigned a score of 3, since the candidate clusters in which it is located match to 3 user accounts of the query (i.e., A1; A1 and A2). The third cluster includes user account B3. B3 is assigned a score of 1, since the candidate cluster in which it is located match to 1 user accounts of the query (i.e., A2). The unique non-matching entity indications are provided in response to the query, optionally according to a ranking of the score thereof. With reference to the previous example, the response to the query is: B1 score 4, B2 score 3, and B3 score 1.

In another example analysis method, multiple candidate abnormality clusters are identified, where each candidate abnormality cluster includes one or more matching entity indications that match one or more of the target entity indication of the query. A score is computed for each unique non-matching entity indication of the candidate abnormality clusters. The score is indicative of a number of candidate abnormality clusters in which the respective unique non-matching entity indication is a member thereof that include one or more matching entity indications. Referring to the example in which the query includes user accounts A1 and A2. Three candidate abnormality clusters are identified, the first candidate abnormality cluster includes A1, and second includes both A1 and A2, and the third includes only A2. The first, second, and third clusters include user account B1. The score for B1 is 3, since B1 is included in three abnormality clusters that each include at least one match to the entities of the query. The first and second clusters include user account B2. B2 is assigned a score of 2. The third cluster includes user account B3. B3 is assigned a score of 1. The unique non-matching entity indications are provided in response to the query, optionally according to a ranking of the score thereof. With reference to the previous example, the response to the query is: B1 score 3, B2 score 2, and B3 score 1.

At 112, the identified encrypted result entity indication(s) are provided in response to the query, for example, transmitted over the network to the client terminal and/or server that provided the query.

The encrypted result entity indications may be decrypted by the receiving client terminal and/or server. The entities corresponding to the indications may be obtained, for example, according to a mapping dataset that maps between indications and entities, for example, mapping the numbering system of the indications to the actual values of the entities (e.g., indication coding system→user account number).

The identified encrypted (or decrypted) result entities may be ranked according to the score, indicative of likelihood of displaying and/or performing the common feature in the future time interval.

When the query is analyzed based on the filtered abnormality clusters, the set of identified result entities is statistically unbiased with respect to the selected feature.

A report may be generated, including a ranked list of the encrypted or decrypted result entities according to respective computed scores. The scores may be provided in the report. It is noted that the report may be generated for the encrypted result entities, providing a secure report since each encrypted result entity cannot in and of itself be traced to a specific real-world entity (e.g., user account).

At 114, an automated process may be executed in response to the obtained encrypted result entity. The automated process may be for execution in association with the entities (e.g., user accounts) corresponding to the encrypted indications.

The automated process may be executed by the client terminal and/or server that provided the query and that received the response to the query.

The automated process may be according to a set of rules, based on the common feature of the query. For example, when entities of the query performed a certain action, the automated process may be executed for the decrypted entities according to the certain action. For example, when user accounts of the query all performed the certain action (e.g., made a transaction), the user accounts of the response to the query may be sent a promotional message offering a discount for performing the transaction.

The automated process may be, for example, selection of targeted advertisement(s) according to the certain action and/or common feature. For example, advertisements may be selected with the goal of encouraging the user to perform the certain action to obtain the common feature (e.g., offering a sale on the product the user is predicted to purchase), advertisement may be selected with the goal of discouraging from performing the certain action to obtain the common feature such as encouraging performance of another target action (e.g., offering a sale on services to keep the current user as a client and prevent migration to another service provider). The selected target advertisement(s) may be provided to the user accounts predicted to perform the common feature, for example, presented on a display of a client terminal of a user when the user logs in to the user account.

Figure 3:
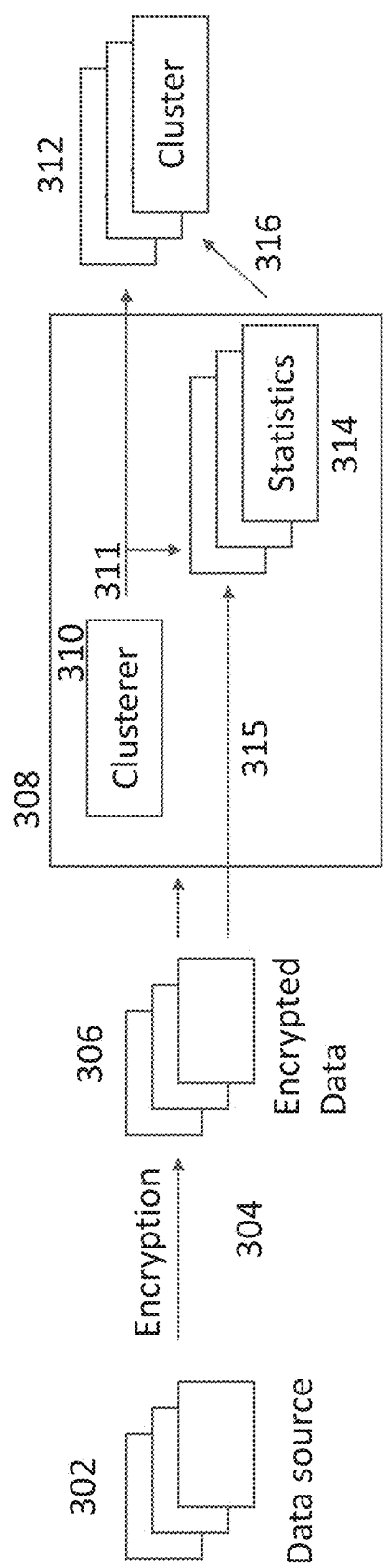
FIG. 3 is a dataflow diagram depicting an exemplary process for generating abnormality clusters and optionally associated statistics from an encrypted dataset, in accordance with some embodiments of the present invention.

Reference is now made to FIG. 3, which is a dataflow diagram depicting an exemplary process for generating abnormality clusters and optionally associated statistics from an encrypted dataset, in accordance with some embodiments of the present invention. The dataflow described with reference to FIG. 3 may be implemented based on features described with reference to FIG. 1 (e.g. acts 102-104), and/or by components of system 200 described with reference to FIG. 2. A data source 302 is encrypted 304 to generate encrypted dataset 306. A process 308 (e.g., computing device) executes a clusterer 310 code that generates 311 abnormality clusters 312, as described herein. Optionally, statistics 314 are computed 315 for respective abnormality clusters 312 according to encrypted dataset 306, as described herein. Statistical 314 may be mapped 316 to corresponding abnormality clusters 312 for filtering of the abnormality clusters 312, as described herein.

Figure 4:
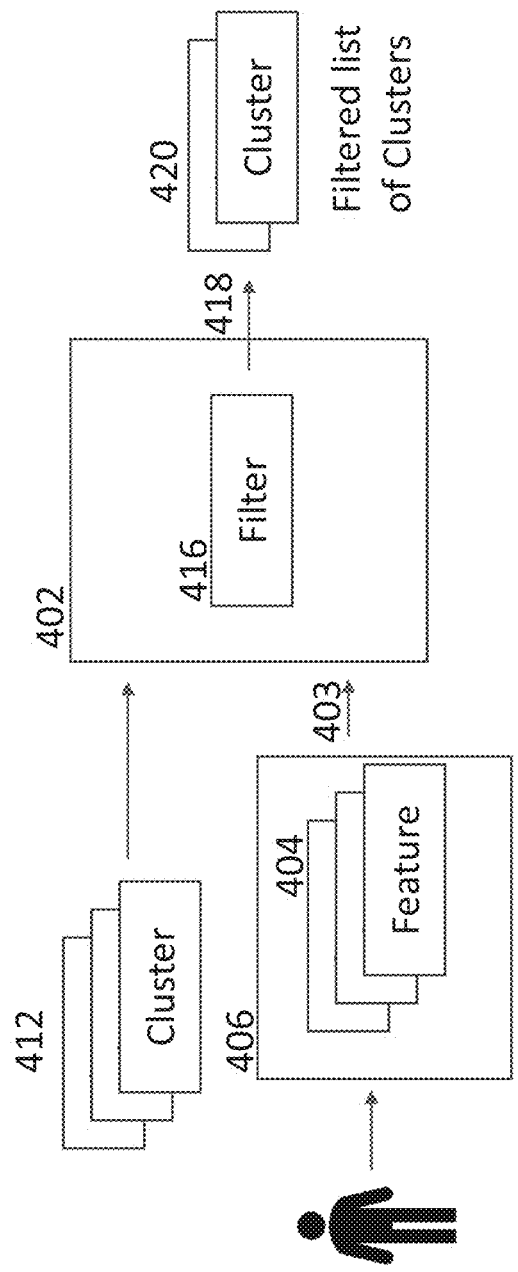
FIG. 4 is a dataflow diagram depicting an exemplary process for filtering abnormality clusters according to user input and optionally associated statistics from an encrypted dataset, in accordance with some embodiments of the present invention.

Reference is now made to FIG. 4, which is a dataflow diagram depicting an exemplary process for filtering abnormality clusters according to user input and optionally associated statistics from an encrypted dataset, in accordance with some embodiments of the present invention. The dataflow described with reference to FIG. 4 may be implemented based on features described with reference to FIG. 1 (e.g., act 106), and/or by components of system 200 described with reference to FIG. 2. An unbiasing process 402 (e.g., computing device) receives abnormality clusters 412 (e.g., which may be abnormality clusters 312 generated by dataflow described with reference to FIG. 3). Unbiasing process 402 receives 403 selected meta-data feature(s) 404 for which unbiasing is to occur. Feature(s) 404 may be selected by a selection process 406 (e.g., computing device, client terminal) optionally operated by a user. The selection may be performed based on the statistics of the abnormality clusters computed by dataflow described with reference to FIG. 3. Clusters 412 are filtered 416 according to the selected features 404 to generate 418 a set of filtered abnormality clusters 420, as described herein.

Figure 5:
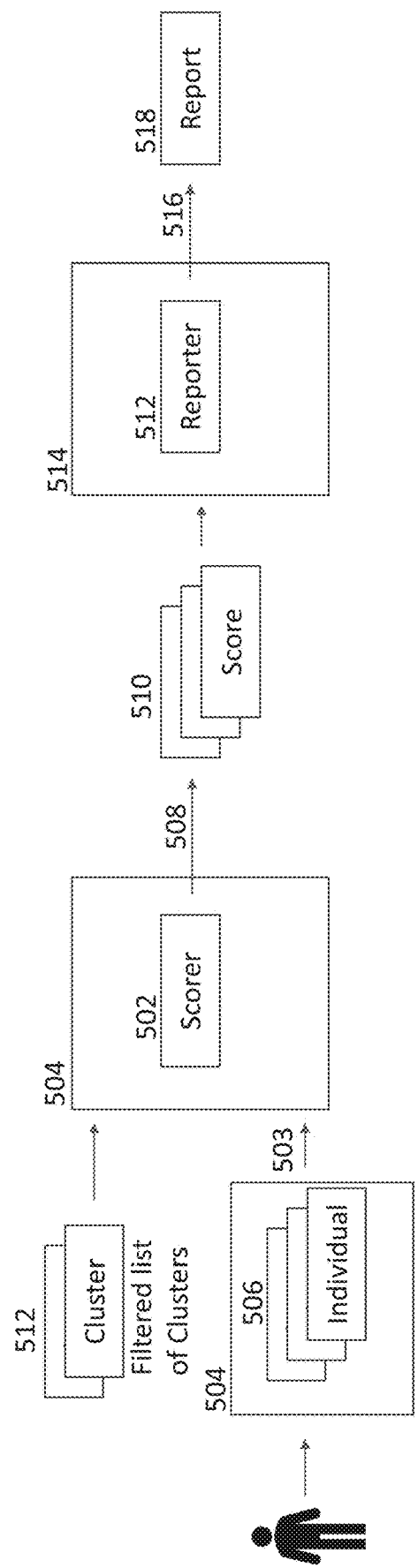
FIG. 5 is a dataflow diagram depicting an exemplary process for analyzing a query based on the filtered abnormality clusters to output a prediction of one or more entities according to computed scores, in accordance with some embodiments of the present invention.

Reference is now made to FIG. 5, which is a dataflow diagram depicting an exemplary process for analyzing a query based on the filtered abnormality clusters to output a prediction of one or more entities according to computed scores, in accordance with some embodiments of the present invention. The dataflow described with reference to FIG. 5 may be implemented based on features described with reference to FIG. 1 (e.g., act 108-112), and/or by components of system 200 described with reference to FIG. 2. A scorer process 502 executed by an analysis process 504 (e.g., computing device) receives abnormality clusters 512, optionally filtered abnormality clusters 420 computed by dataflow described with reference to FIG. 4. Scorer 502 receives 503 a query 504 that includes a set of target indications of respective target entities 506 associated with one or more common features. Scorer 502 outputs 508 computed scores 510 for each encrypted result entity indication. The result entity indications are selected according to a likelihood of the respective encrypted result entity indications predicted to correlate to the common feature(s) of the query at a future time interval. A reporter process 512 executed by a reporting system 514 (e.g., computing device, client terminal, server) analyzes scores 510 and outputs 516 a report 518, for example, a sorted list of the top scoring result entity indications. Alternatively or additionally, reported 512 maps the result entity indications to actual entities, and outputs 516 report 518 including the actual entity indications for further process, for example, user accounts likely to perform a target action.

Figure 6:
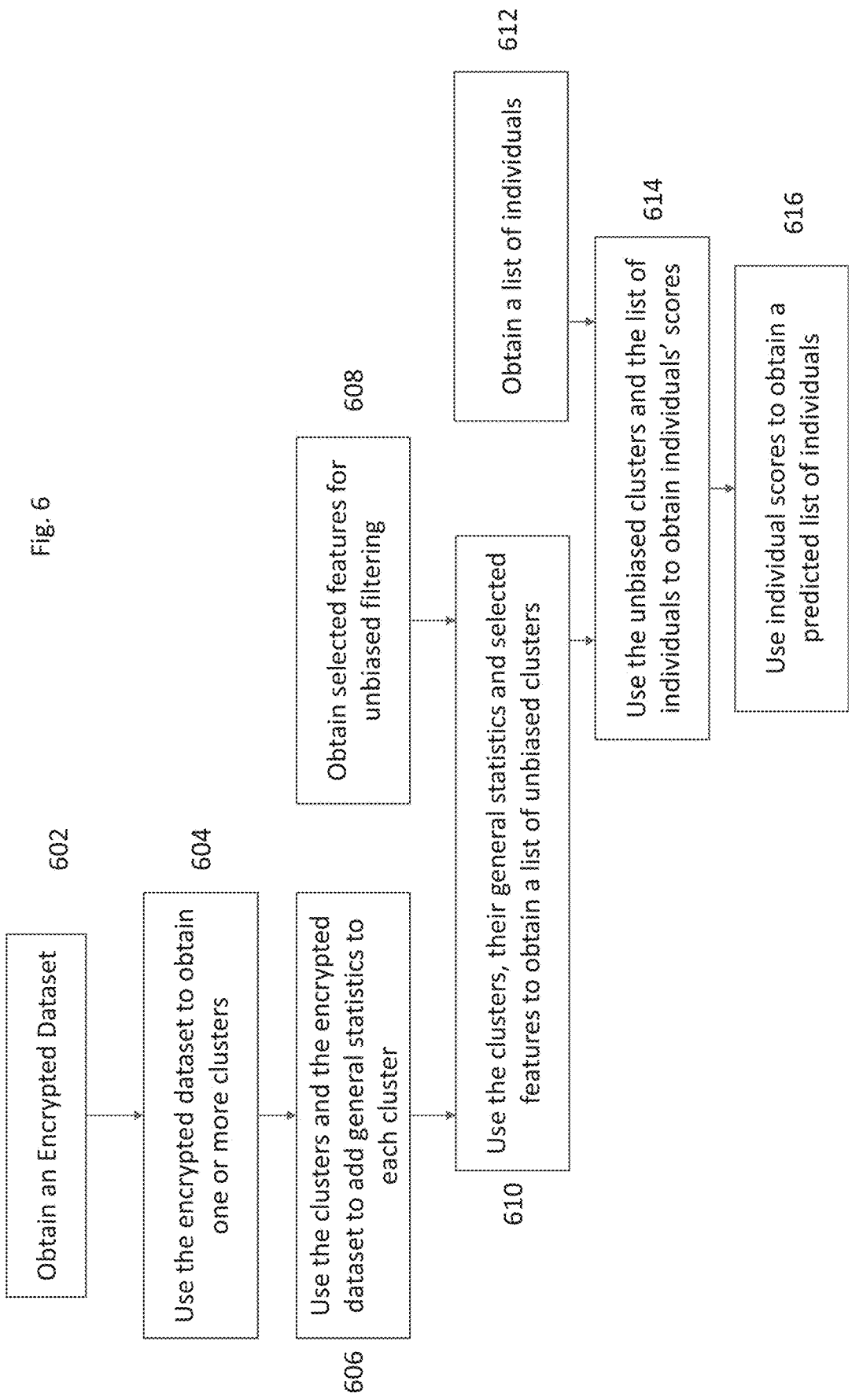
FIG. 6 is a flowchart of an exemplary process of predicting indications of entities based on an encrypted dataset, in accordance with some embodiments of the present invention.

Reference is now made to FIG. 6, which is a flowchart of an exemplary process of predicting indications of entities (e.g., individual users) based on an encrypted dataset, in accordance with some embodiments of the present invention. The process described with reference to FIG. 6 may be implemented based on features described with reference to FIG. 1, and/or by components of system 200 described with reference to FIG. 2. At 602, an encrypted dataset is obtained, for example, as described with reference to act 102 of FIG. 1. At 604, the encrypted dataset is used to obtain one or more abnormality clusters, for example, as described with reference to act 104 of FIG. 1. At 606, the abnormality clusters and the encrypted dataset are used to compute general statistics for each abnormality cluster, for example, as described with reference to act 106 of FIG. 1. At 608, selected features are obtained for performing unbiased filtering, for example, as described with reference to act 106 of FIG. 1. At 610, the abnormality clusters are filtered based on the general statistics and the selected features to obtain a list of unbiased clusters, for example, as described with reference to act 106 of FIG. 1. At 612, a query including a list of individuals (i.e., entities) associated with one or more common features is obtained, for example, as described with reference to act 108 of FIG. 1. At 614, scores are computed for encrypted result entity indication (e.g., target individuals) based on the unbiased clusters and the list of entities (e.g., individuals) of the query, for example, as described with reference to act 110 of FIG. 1. At 616, the scores of the encrypted result entities indications (e.g., individual scores) are used to obtain a predicted list of entities (e.g., predicted list of individuals) predicted to correlate to the common feature(s) of the query at a future time interval, for example, as described with reference to act 112 of FIG. 1. The predicted list of entities may be obtained by decrypting the encrypted result entity indications and/or according to a ranking of associated scores.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computing devices will be developed and the scope of the term computing device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for computing an encrypted prediction in response to an encrypted query, comprising:
    obtaining an encrypted dataset comprising a plurality of encrypted records for respective plurality of encrypted entities, each record storing encrypted parameter values of parameters and an associated indication of the respective entity;
    computing a plurality of abnormality clusters according to the records of the encrypted dataset, wherein each of the plurality of abnormality clusters stores indications of entities of records of the encrypted dataset having at least one mathematically significant common abnormal feature that statistically differentiates records of the respective abnormality cluster from other records of the encrypted dataset;
    receiving a query comprising a plurality of target indications of respective target entities associated with at least one common feature;
    analyzing the query according to the abnormality clusters to identify at least one encrypted result entity indication according to a likelihood of the encrypted result entity indication predicted to correlate to the at least one common feature at a future time interval; and
    providing, in response to the query, the at least one encrypted result entity indication.

2. The method according to claim 1, wherein an automated process for execution in association with user accounts corresponding to respective at least one result entity indications is in response to receiving the at least one encrypted result entity indication.

3. The method according to claim 2, wherein the automated process is executed by a client terminal that provided the query and that received the response to the query.

4. The method according to claim 1, further comprising:
receiving a plurality of encrypted search records for respective plurality of encrypted search entities, each search record storing encrypted search parameter values of search parameters and an associated indication of the respective encrypted search entity;
adding the encrypted search records to the encrypted dataset to create an aggregated encrypted dataset storing an aggregation of records, wherein the encrypted search records are tagged for identification thereof;
wherein the plurality of abnormality clusters are computed according to the aggregation of records of the aggregated encrypted dataset;
wherein the query is analyzed according to the abnormality clusters to identify at least one encrypted search entity.

5. The method according to claim 4, wherein the records of the encrypted dataset are associated with a timestamp within a historical time interval, wherein the encrypted search records are associated with a timestamp within the historical time interval, wherein the query includes target indications of respective target entities associated with at least one common feature associated with a timestamp within the historical time interval, wherein the at least one encrypted result entity indication is predicted to correlate to the at least one common feature at the future time interval.

6. The method according to claim 1, wherein the abnormality clusters do not store encrypted parameter values.

7. The method according to claim 1, wherein the abnormality clusters only store indications of entities.

8. The method according to claim 1, wherein the at least one encrypted result entity indication does not correlate to the at least one common feature at a current and historical time interval prior to the future time interval.

9. The method according to claim 1, wherein the abnormality clusters are computed according to different unique combinations of mathematically significant common abnormal features that statistically differentiate records of the respective abnormality cluster from other records of the encrypted dataset.

10. The method according to claim 1, wherein the mathematically significant common abnormality feature that statistically differentiates records of the respective abnormality cluster from other records of the encrypted dataset is selected from the group consisting of: based on social physics laws, mathematical invariance, and graph-theoretic calculations.

11. The method according to claim 1, further comprising:
computing a multidimensional space according to candidate values of a plurality of sets of rules and/or mathematical functions;
defining an abnormality region of the multidimensional space denoting abnormalities that violate the plurality of sets of rules and/or mathematical functions, the abnormality region denoting the at least one mathematically significant common abnormal features;
mapping the records of the encrypted dataset into the multidimensional space by evaluating the records according to the plurality of sets of rules and/or mathematical functions;
wherein the abnormality clusters are computed by clustering records mapped to the abnormality region of the multidimensional space.

12. The method according to claim 1, wherein the mathematically significant common abnormality feature that statistically differentiates records of the respective abnormality cluster from other records of the encrypted dataset comprises: an abnormality requirement of a plurality of set of rules and/or a plurality of mathematical function, wherein the abnormality clusters are computed according to entity indications corresponding to records evaluated by the set of rules and/or at least one mathematical function that meet the abnormality requirement.

13. The method according to claim 12, wherein the abnormality clusters are computed according to entity indications corresponding to records that violate the set of rules and/or a plurality of mathematical function according to the abnormality requirement.

14. The method according to claim 13, wherein the abnormality requirement is selected to exclude noise from the abnormality cluster.

15. The method according to claim 13, wherein the abnormality requirement is selected to exclude improbably normal records having extreme values from the abnormality cluster.

16. The method according to claim 1, wherein the mathematically significant common feature that statistically differentiates records of the respective abnormality cluster from other records of the encrypted dataset comprises:
calculation of a degree-distribution of sub-graphs generated from the records of the encrypted dataset, wherein nodes of each sub-graph represent respective entities of the records,
wherein according to a mathematical invariance the sub-graphs degree-distribution obeys a scale-free power-law;
identifying abnormal sub-graphs that violate the scale-free power-law degree-distribution; and
creating the abnormality clusters according to the indication of entities of the records of each respective abnormal sub-graph.

17. The method according to claim 1, wherein abnormality clusters overlap by including a same entity indication as a member of each of the overlapping abnormality clusters.

18. The method according to claim 1, wherein the analyzing of the query according to the abnormality clusters is performed by:
identifying a plurality of candidate abnormality clusters each having at least one matching entity indication that matches the target entity indication of the query;
computing a score for each unique non-matching entity indication of the plurality of candidate abnormality clusters, the score indicative of a number of matching entity indications in the candidate abnormality clusters in which the respective unique non-matching entity indication is a member thereof; and
providing at least one of the unique non-matching entity indications according to a ranking of the score thereof.

19. The method according to claim 1, wherein the analyzing of the query according to the abnormality clusters is performed by:
identifying a plurality of candidate abnormality clusters each having at least one matching entity indication that matches the target entity indication of the query;
computing a score for each unique non-matching entity indication of the plurality of candidate abnormality clusters, the score indicative of a number of candidate abnormality clusters in which the respective unique non-matching entity indication is a member thereof that include at least one matching entity indications; and
providing at least one of the unique non-matching entity indications according to a ranking of the score thereof.

20. The method according to claim 1, wherein the encrypted dataset and the abnormality clusters are stored on distinct storage devices.

21. The method according to claim 1, wherein access to the encrypted dataset is blocked upon creation of the abnormality clusters.

22. The method according to claim 1, wherein the plurality of entities are associated with a plurality of user accounts, and the encrypted parameter values are computed based on interactive actions performed by the plurality of user accounts.

23. The method according to claim 22, wherein the plurality of entities and corresponding plurality of encrypted parameter values are selected from the group consisting of: user accounts and transactions between user accounts, user social network accounts and interactive actions performed between social network accounts, financial user accounts and financial transfers between financial user accounts, blockchain user accounts and blockchain transactions between blockchain user accounts, user phone accounts and call data records between phones, user network login accounts and computer network access logs, and user email addresses and email messages sent between user email addresses.

24. The method according to claim 22, wherein the plurality of encrypted parameter values further comprise additional data of a user associated with the respective user account.

25. The method according to claim 24, wherein the additional data includes demographic data of the user.

26. The method according to claim 22, wherein the plurality of encrypted parameter values further comprise a value indicative of a transaction between user accounts.

27. The method according to claim 1, wherein metadata stored in the encrypted dataset indicative of a respective parameter for each respective parameter value is encrypted.

28. The method according to claim 1, wherein the parameter values are encrypted according to an encryption process that maps a same value to a same encrypted target.

29. The method according to claim 1, wherein indication of entities of the records clustered into abnormality clusters are encrypted.

30. The method according to claim 1, wherein the encrypted dataset is created by aggregation of a plurality of encrypted sub-datasets, each comprising respective records including a respective combination of encrypted parameter values for a respective plurality of entities.

31. The method according to claim 30, wherein each encrypted sub-dataset is encrypted with a respective unique encryption process, the encrypted dataset comprising parameter values encrypted with a plurality of respective unique encryption processes.

32. The method according to claim 1, further comprising filtering the abnormality clusters based on encrypted parameters of the parameter values to generate a sub-set of statistically unbiased abnormality clusters that adhere to predefined statistical thresholds indicative of unbiased data, wherein the query is analyzed according to the statistically unbiased abnormality clusters to provide at least one encrypted result entity indication that is statistically unbiased with respect to a random distribution.

33. The method according to claim 32, further comprising:
computing at least one statistical value for at least one parameter corresponding to each abnormality cluster according to the encrypted parameter values of the respective abnormality cluster,
selecting at least one parameter according to the at least one statistical value; and
wherein filtering comprises filtering the abnormality clusters according to the corresponding selected at least one parameter,
wherein the provided at least one encrypted result entity indication is statistically unbiased with respect to the selected at least one parameter.

34. The method according to claim 33, wherein the at least one statistical value is stored independently from the abnormality clusters.

35. The method according to claim 33, wherein the at least one statistical value computed for each at least one parameter comprises a frequency and/or distribution of the encrypted parameter values of the records of the corresponding respective abnormality cluster.

36. The method according to claim 33, wherein the sub-set of statistically unbiased abnormality clusters are selected from the abnormality clusters according to a probability that a distributed of encrypted parameter values of the selected at least one parameter is statistically similar to an expected random distribution of the selected at least one parameter.

37. The method according to claim 1, further comprising: iteratively obtaining additional encrypted records, adding the additional encrypted records to the encrypted dataset, and iteratively computing the abnormality clusters.

38. The method according to claim 1, wherein the abnormality clusters are computed directly according to raw data stored in the encrypted dataset without pre-processing of the raw data.

39. The method according to claim 38, wherein pre-processing of the raw data includes at least one member of the group consisting of: sanitation, normalization, and noise removal.

40. A system for computing an encrypted prediction in response to an encrypted query, comprising:
at least one hardware processor; and
a non-transitory memory having stored thereon a code for execution by the at least one hardware processor, the code comprising instructions for:
obtaining an encrypted dataset comprising a plurality of encrypted records for respective plurality of encrypted entities, each record storing encrypted parameter values of parameters and an associated indication of the respective entity,
computing a plurality of abnormality clusters according to the records of the encrypted dataset, wherein each of the plurality of abnormality clusters stores indications of entities of records of the encrypted dataset having at least one mathematically significant common abnormal feature that statistically differentiates records of the respective abnormality cluster from other records of the encrypted dataset,
receiving a query comprising a plurality of target indications of respective target entities associated with at least one common feature,
analyzing the query according to the abnormality clusters to identify at least one encrypted result entity indication according to a likelihood of the encrypted result entity indication predicted to correlate to the at least one common feature at a future time interval, and
providing, in response to the query, the at least one encrypted result entity indication.

41. A computer program product for computing an encrypted prediction in response to an encrypted query, comprising:
- a non-transitory memory having stored thereon a code for execution by at least one hardware processor, the code comprising instructions for:
  - obtaining an encrypted dataset comprising a plurality of encrypted records for respective plurality of encrypted entities, each record storing encrypted parameter values of parameters and an associated indication of the respective entity;
  - computing a plurality of abnormality clusters according to the records of the encrypted dataset, wherein each of the plurality of abnormality clusters stores indications of entities of records of the encrypted dataset having at least one mathematically significant common abnormal feature that statistically differentiates records of the respective abnormality cluster from other records of the encrypted dataset;
  - receiving a query comprising a plurality of target indications of respective target entities associated with at least one common feature;
  - analyzing the query according to the abnormality clusters to identify at least one encrypted result entity indication according to a likelihood of the encrypted result entity indication predicted to correlate to the at least one common feature at a future time interval; and
  - providing, in response to the query, the at least one encrypted result entity indication.

* * * * *